(12) United States Patent
Kimura

(10) Patent No.: US 11,309,689 B2
(45) Date of Patent: Apr. 19, 2022

(54) SPARK PLUG AND METHOD FOR MANUFACTURING SPARK PLUG

(71) Applicant: NGK SPARK PLUG CO., LTD., Nagoya (JP)

(72) Inventor: Junji Kimura, Nagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 0 days.

(21) Appl. No.: 17/405,189

(22) Filed: Aug. 18, 2021

(65) Prior Publication Data

US 2022/0060000 A1    Feb. 24, 2022

(30) Foreign Application Priority Data

Aug. 19, 2020   (JP) ............... JP2020-138440

(51) Int. Cl.
| | | |
|---|---|---|
| H01T 13/58 | (2020.01) | |
| H01T 13/02 | (2006.01) | |
| H01T 21/02 | (2006.01) | |
| B23K 26/359 | (2014.01) | |

(52) U.S. Cl.
CPC ............ *H01T 13/58* (2013.01); *H01T 13/02* (2013.01); *H01T 21/02* (2013.01); *B23K 26/359* (2015.10)

(58) Field of Classification Search
CPC .................................................. H01T 13/58
USPC ................................................... 313/118
See application file for complete search history.

(56) References Cited

U.S. PATENT DOCUMENTS

| | | | |
|---|---|---|---|
| 10,454,253 B2 * | 10/2019 | Maki | ............ H01T 13/32 |
| 2014/0204198 A1 * | 7/2014 | Fujita | ............ H01T 21/02 348/86 |
| 2018/0331511 A1 | 11/2018 | Maki | |
| 2019/0044310 A1 | 2/2019 | Maki | |

FOREIGN PATENT DOCUMENTS

| | | | |
|---|---|---|---|
| JP | 2018-190673 A | 11/2018 | |
| RU | 149859 U1 * | 1/2015 | |

* cited by examiner

*Primary Examiner* — Christopher M Raabe
(74) *Attorney, Agent, or Firm* — Sughrue Mion, PLLC

(57) ABSTRACT

A spark plug including an insulator and a metallic member such as a metallic shell. In the spark plug, a mark such as a two-dimensional code is provided on the surface of at least one of the insulator and the metallic member. Also, a protective layer covers the mark. The protective layer is optically transparent and contains a fluorescent substance.

4 Claims, 3 Drawing Sheets

SPARK PLUG AND METHOD FOR MANUFACTURING SPARK PLUG

BACKGROUND OF THE INVENTION

1. Field of the Invention

The present invention relates to a spark plug used for an internal combustion engine and a method for manufacturing the same.

2. Description of the Related Art

Spark plugs have been used as igniting means for internal combustion engines such as engines for automobiles. Such a spark plug includes, for example, a rod-shaped center electrode, an approximately cylindrical insulator holding the center electrode therein, and a metallic shell holding the insulator therein.

In general, a spark plug has a mark, such as a manufacturer name, a logo mark, or a product number, applied thereto. The mark is composed of, for example, a character (s), a symbol(s), and/or an image(s). In recent years, there has been increasing demand for applying a previously defined identification mark, such as a two-dimensional code, to a spark plug, to thereby, enable obtaining historical information of the spark plug in a process of distributing the product.

For example, an ignition plug disclosed in Japanese Patent Application Laid-Open (kokai) No. 2018-190673 has a mark formed by an oxide film produced on the surface of a metallic member or a mark formed by the metallic member and the oxide film. The mark is formed by irradiating the surface of the metallic member with a laser beam to form an oxide film on the surface of the metal member or remove the oxide film.

Spark plugs may be exposed to an environment of high temperature and high humidity, for example, when the spark plugs are transported by sea in the course of their distribution. As a result, in some cases, rust is generated on the surface of the identification mark applied to each spark plug, and reading the identification mark becomes difficult.

Also, in the case where a plurality of spark plugs are packed together and are transported, spark plugs located adjacent to each other may come into contact with and rub against each other, or spark plugs may come into contact with and rub against a cushioning material. In such a case, the identification marks applied to the spark plugs may be rubbed off.

SUMMARY OF INVENTION

In view of the foregoing, it is an object of the present invention to provide a spark plug which can prevent deterioration of an identification mark such as by rusting or rubbing off of the mark.

The above object has been achieved by providing a spark plug according to a first aspect (1) of the present invention comprises an insulator, a metallic member, a mark provided on a surface of at least one of the insulator and the metallic member, and a protective layer which covers the mark. In this spark plug, the protective layer is optically transparent and contains a fluorescent substance.

According to the above-described configuration, a protective layer is provided to cover the mark, so that the mark can be protected. Therefore, deterioration of the mark, such as by rusting or rubbing off of the mark, can be prevented in, for example, a process of distributing the spark plug. Furthermore, the protective layer contains a fluorescent substance. Therefore, after forming the mark, whether or not the protective layer is formed in an appropriate region can be determined by irradiating the mark with light having a predetermined wavelength, thereby, causing the protective layer to develop a color.

A second aspect (2) of the present invention relates to a method for manufacturing a spark plug which includes an insulator and a metallic member and has a mark on a surface of at least one of the insulator and the metallic member. This manufacturing method comprises a mark forming step of forming the mark, and a protective layer forming step of forming a protective layer containing a fluorescent substance which covers the mark.

According to the above-described manufacturing method, the protective layer containing a fluorescent substance can be formed on the surface of at least one of the insulator and the metallic member. Since the fluorescent substance-containing protective layer is formed on the mark, deterioration of the mark applied to the spark plug, such as by rusting and rubbing off of the mark, can be prevented. Also, since the protective layer contains the fluorescent substance, after forming the mark, the region where the protective layer is formed can be checked by irradiating the mark with light having a predetermined wavelength, thereby causing the protective layer to develop a color.

In a preferred embodiment (3), the method for manufacturing a spark plug according to the second aspect of the present invention further comprises a checking step of checking, after the protective layer forming step, a state of the protective layer by irradiating the mark with light.

According to the above-described manufacturing method, after forming the mark and the protective layer, whether or not the protective layer is formed in an appropriate region can be determined by irradiating the mark with light such as ultraviolet rays, thereby causing protective layer to develop a color.

In another preferred embodiment (4) of the method for manufacturing a spark plug (3) according to the second aspect of the present invention, the state of the protective layer may be checked in the checking step by using, as a reference value, an amount of light emitted when a mark covered with a protective layer having a predetermined thickness is irradiated with the light, measuring an amount of light emitted when the spark plug to be checked is irradiated with the light, and comparing the measured light emission amount with the reference value.

According to the above-described manufacturing method (4), it is possible to check whether or not the protective layer has been formed to have an appropriate thickness.

As described above, in the spark plug according to the first aspect of the present invention, since a protective layer which covers the mark is provided, the mark can be protected. Therefore, deterioration of the mark, such as by rusting or rubbing off of the mark, can be prevented in, for example, a process of distributing the spark plug. Furthermore, in the spark plug according to the first aspect of the present invention, since the protective layer contains a fluorescent substance, the state of the protective layer can be checked by irradiating the mark with light, for example, after forming the mark and in a subsequent product distribution process. Also, the spark plug manufacturing method according to the second aspect of the present invention enables production of a spark plug which can prevent deterioration of a mark applied to the spark plug, such as by rusting and rubbing off of the mark.

DETAILED DESCRIPTION OF THE PREFERRED EMBODIMENTS

Various embodiments of the present invention will now be described with reference to the drawings. However, the present invention should not be construed as being limited thereto. In the following description, identical components are denoted by the same reference sign. Their names and functions are the same. Therefore, a detailed description of the identical components will not be repeated.

First Embodiment

Figure 1:
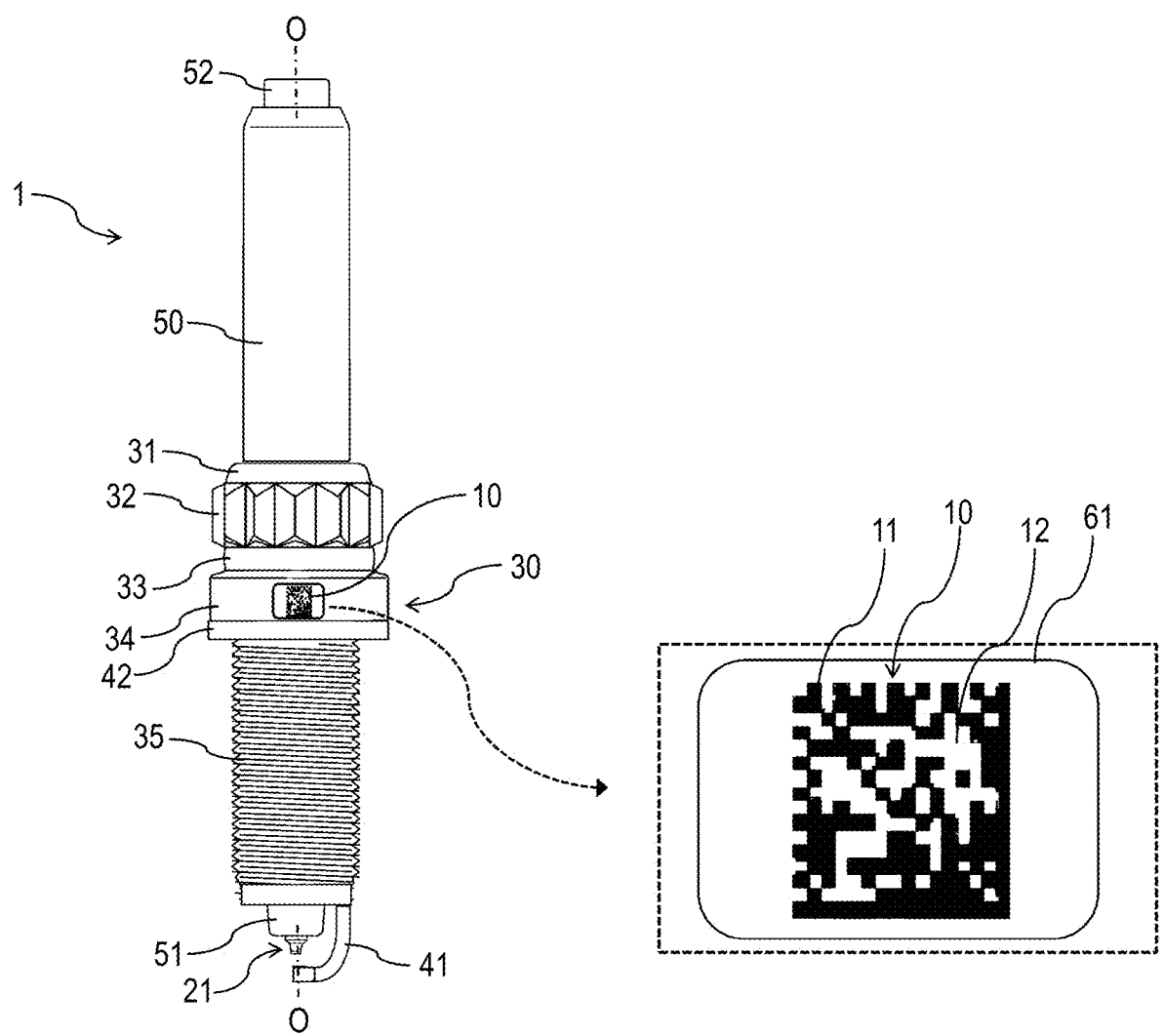
FIG. 1 includes a side view showing the appearance of a spark plug according to a first embodiment and an enlarged view of a mark applied to the spark plug.

In the first embodiment, a spark plug having a mark applied to the surface of a metallic member (specifically, a metallic shell 30) will be described as one example of the spark plug of the present invention. In FIG. 1, the appearance of a spark plug 1 according to the present embodiment is shown. Also, in FIG. 1, a mark (specifically, a two-dimensional code 10) applied to to the spark plug 1 is shown on an enlarged scale.

Overall Structure of Spark Plug

First, the overall structure of the spark plug 1 will be described with reference to FIG. 1 The spark plug 1 includes an insulator 50 and the metallic shell 30.

The insulator 50 is an approximately cylindrical tubular member extending in a longitudinal direction of the spark plug 1. The insulator 50 is formed of a material which is excellent in insulating property, heat resistance, and thermal conductivity. For example, the insulator 50 is formed of an alumina-based ceramic material or the like. A center electrode 21 is provided in one end portion (forward end portion 51) of the insulator 50. A metallic terminal member 52 is attached to the other end portion (rear end portion) of the insulator 50. The metallic terminal member 52 is one example of the metallic member in the spark plug according to the present invention.

The center electrode 21 is inserted into and held in an axial hole of the insulator 50 so that a forward end portion of the center electrode 21 protrudes from the forward end portion 51 of the insulator 50. The center electrode 21 is attached to the insulator 50 so that the forward end portion of the center electrode 21 is located on an axial line O of the approximately cylindrical tubular insulator 50. The center electrode 21 has an approximately circular columnar shape, and the forward end portion of the center electrode 21 is tapered so that the diameter of the center electrode 21 decreases.

The metallic shell 30 is an approximately cylindrical tubular member which is fixed to a threaded hole of an internal combustion engine. The metallic shell 30 partially covers the insulator 50. The metallic shell 30 is formed of an electrically conductive metallic material. Examples of such a metallic material include low carbon steel and a metallic material which contains iron as a main component. The metallic shell 30 is another example of the metallic member in the spark plug according to the present invention.

The metallic shell 30 mainly has a crimp portion 31, a tool engagement portion 32, a curved portion 33, a bearing portion 34, and a screw portion 35.

The crimp portion 31 and the curved portion 33 are portions for attaching the metallic shell 30 to the insulator 50. The tool engagement portion 32 is a portion with which a tool such as a wrench is engaged when the metallic shell 30 is attached to the threaded hole of the internal combustion engine. The bearing portion 34 is located between the tool engagement portion 32 and the screw portion 35. In a state in which the spark plug 1 is attached to the internal combustion engine, an annular gasket 42 is disposed on an end surface (bearing surface) on the forward end side of the bearing portion 34. The screw portion 35 is located on the side toward the forward end portion 51 of the insulator 50. When the spark plug 1 is attached to the internal combustion engine, a screw thread formed on the outer circumference of the screw portion 35 is brought into thread-engagement with the threaded hole of the internal combustion engine.

A ground electrode 41 is attached to a forward end portion of the metallic shell 30 (on the side where the screw portion 35 is located). The ground electrode 41 is a rod-like member bent to have an approximately L-like shape as a whole, and a proximal end portion of the ground electrode 41 is fixedly joined to a forward end surface of the metallic shell 30. A distal end portion of the ground electrode 41 extends to a position through which an imaginary extension line of the axial line O of the insulator 50 passes. A protrusion (not shown) protruding toward the center electrode 21 is formed on the ground electrode 41 to be located near the distal end of the ground electrode 41.

Each of the center electrode 21 and the ground electrode 41 is formed, for example, by using, as a base material, a metallic material such as an Ni-based alloy containing Ni (nickel) as a main component. An example of an alloy element added to the Ni-based alloy is Al (aluminum). Each of the center electrode 21 and the ground electrode 41 may include a core formed of a metal (e.g., Cu (Copper)) or a metallic material (e.g., Cu alloy) which have excellent thermal conductivity.

The ground electrode 41 may contain, as a component other than Ni, at least one element selected from Mn (manganese), Cr (chromium), Al (aluminum), and Ti (titanium).

The forward end portion of the center electrode 21 may be composed of a noble metal tip formed into a circular columnar shape. The noble metal tip is joined to the forward end of the center electrode 21 by means of, for example, welding.

Plating layers are formed on the surface of the metallic shell 30 and on the surface of the ground electrode 41, respectively. The plating layers formed on these surfaces prevent corrosion of the metallic shell 30, the ground electrode 41, etc. The plating layers may contain, for example, Zn (zinc), Ni (nickel), Sn (tin), and Cr (chromium).

Notably, a plating layer similar to the above-described plating layers is formed on the surface of the metallic terminal member 52 of the insulator 50. Therefore, corrosion of the metallic terminal member 52 can be prevented.

Mark of Spark Plug

A two-dimensional code 10, which is one example of the mark, is applied to the spark plug 1 The two-dimensional code 10 is, for example, a Data Matrix code, a QR code (registered trademark), or the like. The two-dimensional code 10 represents various types of information for identifying an individual spark plug, such as product information of the spark plug 1 and historical information associated with a manufacturing process.

Notably, in the present invention, the mark is not limited to a two-dimensional code. Examples of the mark other than the two-dimensional code include a one-dimensional code such as a bar code, and a mark composed of a character(s), a symbol(s), and/or an image(s). Alternatively, the mark may be a combination of some of a one-dimensional code, a two-dimensional code, a character(s), a symbol(s), and an image(s).

In the spark plug 1 of the present embodiment, the two-dimensional code 10 is applied to an arbitrary position on the surface of the metallic shell 30. No particular limitation is imposed to the position where the two-dimensional code 10 is applied. For example, as shown in FIG. 1, the two-dimensional code 10 can be formed on the outer circumferential surface of the bearing portion 34 of the metallic shell 30.

The two-dimensional code 10 includes a first portion 11 which is a set of rectangular cells and a second portion 12 which is a set of rectangular cells which are higher in reflectance than the first portion 11. In the present embodiment, the first portion 11 serves as a dark module, and the second portion 12 serves as a bright module. Historical information peculiar to a product or a component is displayed by a combination of the first portion 11 and the second portion 12, In the present embodiment, as described below, the first portion 11 is an oxide film, and the second portion 12 is a ground region. As to a more specific configuration of the two-dimensional code 10, the configuration of a conventionally known mark (for example, a mark 40 disclosed in U.S. Pat. No. 10,468,859 incorporated herein by reference in its entirety and in corresponding Japanese Patent Application Laid-Open (kokai) No, 2018-190673) can be applied to the two-dimensional code 10.

In the spark plug 1 of the present embodiment, the surface of the two-dimensional code 10 is covered with a protective layer 61. As shown in FIG. 1, the protective layer 61 covers a region slightly wider than a region where the two-dimensional code 10 is formed. Namely, the region where the two-dimensional code 10 is formed is contained in the region where the protective layer 61 is formed.

The protective layer 61 is optically transparent. Here, the expression "the protective layer 61 is optically transparent" means that light such as visible light passes through the protective layer 61, and the surface of a layer under the protective layer 61 can be visually recognized. Since the protective layer 61 is optically transparent, the information of the two-dimensional code 10 formed under the protective layer 61 can be read out.

Also, the protective layer 61 contains a fluorescent substance. The fluorescent substance is a substance which emits, upon irradiation with incident light having a predetermined wavelength, light whose wavelength differs from that of the incident light. Since the protective layer 61 contains the fluorescent substance, when the protective layer 61 is irradiated with, for example, light such as ultraviolet rays (black light), visible light is emitted from the fluorescent substance, thereby allowing a person to visually recognize the region where the protective layer 61 is formed.

Notably, in another embodiment, the two-dimensional code 10 may be applied to an end surface of the metallic terminal member 52. Alternatively, the two-dimensional code 10 may, be applied to the metallic shell 30, and a mark composed of characters may be applied to the metallic terminal member 52. In this case, one protective layer 61 is provided on the surface of the metallic shell 30 to cover the two-dimensional code 10, and another protective layer 61 is provided on the surface of the metallic terminal member 52 to cover the mark composed of characters.

Since the surface of the two-dimensional code 10 is covered with the protective layer 61, it is possible to prevent generation of rust in the region of the two-dimensional code 10 and in a region around the two-dimensional code 10. Also, since the protective layer 61 is provided, scratching of the two-dimensional code 10 and rubbing of the two-dimensional code 10 can be avoided. Thus, it is possible to prevent occurrence of a problematic situation in which, for example, when a plurality of spark plugs 1 are packed together and transported, the two-dimensional code 10 applied to each spark plug 1 is damaged, and reading of the two-dimensional code 10 becomes impossible.

Also, since the protective layer 61 contains the fluorescent substance, after forming the mark or in a subsequent process of distributing the product, the region where the protective layer 61 is formed can be checked by irradiating the mark with light. Therefore, when such checking is performed in the process of manufacturing the spark plug 1, it is possible to determine whether or not the protective layer 61 has been formed in an appropriate region in order to cover the entire mark. Also, by irradiating the mark with light in the middle of the distribution process after completing the spark plug 1, it is possible to easily determine whether or not the protective layer 61 has peeled off.

Method for Manufacturing Spark Plug

Net, a method for manufacturing the spark plug 1 will be described. Here, of steps of the method for manufacturing the spark plug 1, a step of forming a mark, such as the two-dimensional code 10 and a step of forming the protective layer 61 which covers the mark will be mainly described. As to the remaining steps of the method for manufacturing the spark plug 1, manufacturing steps similar to those of a conventional spark plug manufacturing method can be applied.

Figure 2:
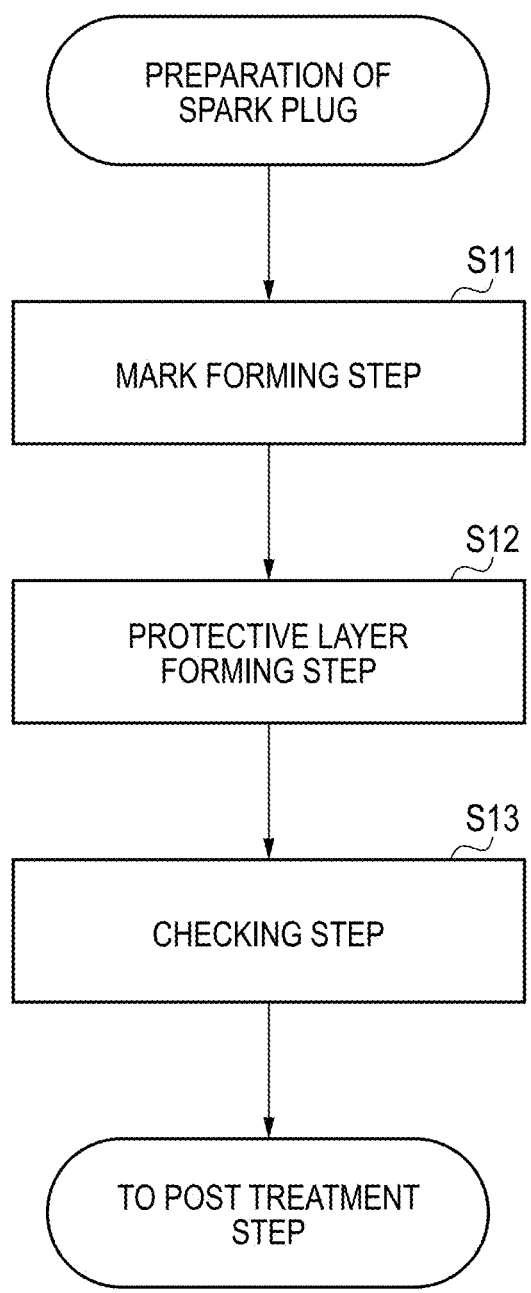
FIG. 2 is a flowchart, showing a portion of a process of manufacturing the spark plug according to an embodiment of the present invention.

FIG. 2 shows successive steps associated with forming the two-dimensional code 10 and the protective layer 61. Below, the case where the two-dimensional code 10 is formed on a completed spark plug 1 will be described as an example. However, the two-dimensional code 10 may be formed on a component of the spark plug 1 in the course of production by a method similar to the method described below.

As shown in FIG. 2, the method for manufacturing the spark plug 1 includes a mark forming step (S11), a protective layer forming step (S12), and a checking step (S13).

Before performing the mark forming step (S11), a spark plug 1 to which the two-dimensional code 10 has not yet been applied is first prepared. In the mark forming step (S11), a mark is formed on a mark forming surface of the spark plug 1. Here, the mark forming surface refers to a region of the surface of the insulator 50 or the metallic member of the spark plug 1, in which region the mark is to be formed. In the example shown in FIG. 1, the mark forming surface is a region of the surface of the bearing portion 34 of the metallic shell 30.

For example, laser machining is used for forming the mark. In the case where the mark is formed using laser machining, a ground region is first formed on the mark forming surface. The ground region is a region which serves as a background in the mark forming region. In the mark forming surface of the spark plug 1, an oxide film has been formed as a result of oxidation of the plating film. The thickness and density of the oxide film may be uneven.

In view of the forgoing, the oxide film formed on the surface is removed by applying a laser beam to the mark forming surface, thereby forming the ground region. As a result, the ground region whose reflectance is higher than that of a subsequently formed mark portion (the first portion 11 in the case where the mark is a two-dimensional code 10) can be formed. For example, in the case where the mark is the two-dimensional code 10, the ground region constitutes the second portion 12.

Subsequently, the laser beam is further applied to the ground region, thereby partially heating the ground region. Thus, formation of oxide film at portions heated by applying the laser beam is promoted. In this laser beam application process, the ground region is scanned with the laser beam using a scanning head, whereby an oxide film can be formed at predetermined locations within the ground region. At that time, laser output, scanning speed, the focal diameter and focal depth of laser beam, etc., are adjusted so as to apply to the spark plug 1 a laser beam having a higher energy than that used for forming the ground region. As a result, oxidation of the laser beam applied portion is promoted, and a black-colored oxide film is thus formed. This oxide film constitutes the first portion 11 of the two-dimensional code 10.

Notably, the degree of oxidation of the oxide film constituting the first portion 11 can be controlled by adjusting the laser output. Therefore, the thickness and density of the oxide film constituting the first portion 11 can be made approximately uniform.

As to a more specific method of the mark forming step (S11), a known mark forming method described in, for example, U.S. Pat. No. 10,468,859 incorporated herein by reference in its entirety and in corresponding Japanese Patent Application Laid-Open (kokai) No. 2018-190673 can be applied.

After the mark is formed on the spark plug 1 in the above-described manner, the protective layer forming step (S12) is performed. In the protective layer forming step, an ink containing a fluorescent substance is applied onto the mark so as to form the protective layer 61 containing the fluorescent substance. An example of the ink containing a fluorescent substance and used as the material of the protective layer 61 is an invisible ink. Such an invisible ink is a functional ink which contains a particular fluorescent substance. The invisible ink has no color under the sunlight, but emits fluorescent light in the visible region when irradiated with light rays having a specific wavelength, such as ultraviolet rays. Notably, the fluorescent substance in the present invention refers to a substance which emits fluorescent light in the visible region when irradiated with light having a specific wavelength.

More specifically, an example of the invisible ink is "eco Butte Ink" (the name of a product of Almarq Inc., product number: B20015V-2). This eco Butte Ink is colorless and transparent in an ordinary state, but emits a pale blue light when irradiated with ultraviolet rays having a wavelength of about 365 nm.

When the ink is applied onto the mark in the protective layer forming step, it is possible to use, for example, a printing method such as an ink jet method, or an impressing method in which a rubber stamp or the like is used. With the lapse of time, alcohol volatilizes from the ink applied onto the mark, and a protective layer forming material containing the fluorescent substance remains and forms the protective layer 61.

As shown in FIG. 1, the protective layer 61 is preferably formed in a region slightly wider than the region where the mark such as the two-dimensional code 10 is formed. As a result, the entire two-dimensional code 10 can be covered with the protective layer 61.

In the method for manufacturing the spark plug 1 according to the present embodiment, after forming the protective layer 61, the checking step (S13) of checking the state of the protective layer 61 is carried out. In the checking step, the spark plug 1 having the mark formed thereon is irradiated with light. Light having a wavelength which excites the fluorescent substance contained in the ink is chosen as the light with which the spark plug 1 is irradiated in the checking step. For example, in the case where the protective layer 61 is formed of the above-mentioned eco Butte Ink, the spark plug 1 is irradiated with ultraviolet rays having a wavelength of 365 nm.

The spark plug 1 is irradiated with light so that at least the region where the mark such as the two-dimensional code 10 is formed is irradiated with light. When the region where the mark is formed is irradiated with light, the fluorescent substance in the protective layer 61 provided to cover the two-dimensional code 10 emits visible light. As a result, the region where the protective layer 61 is formed can be visually recognized.

Figure 3:
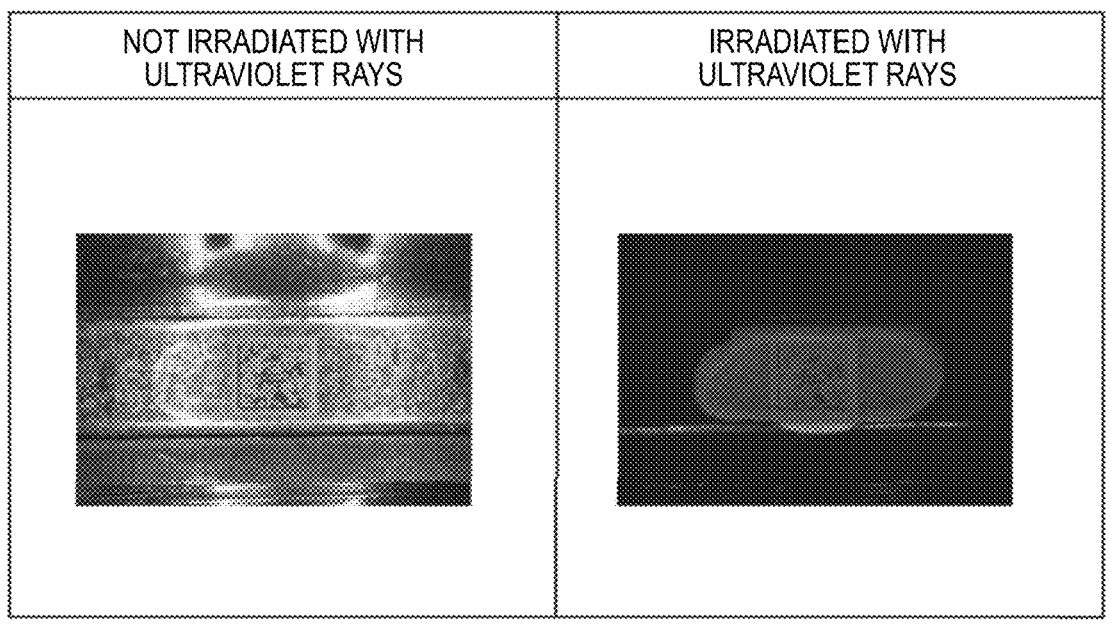
FIG. 3 shows images comparing a case where a two-dimensional code of the spark plug according to the embodiment is irradiated with ultraviolet rays and the case where the two-dimensional code is not irradiated with ultraviolet rays.

FIG. 3 shows images obtained by photographing the two-dimensional code 10 and its vicinity of the spark plug 1 in which the two-dimensional code 10 is formed on the bearing portion 34. The image on the left side of FIG. 3 was obtained by photographing the two-dimensional code 10 and its vicinity in a state in which the spark plug 1 was not irradiated with light having a particular wavelength (specifically, ultraviolet rays having a wavelength of 365 nm), and the image on the right side of FIG. 3 was obtained by photographing the two-dimensional code 10 and its vicinity in a state in which the spark plug 1 was irradiated with light having the particular wavelength (specifically, ultraviolet rays having a wavelength of 365 nm).

In the case where the spark plug 1 is not irradiated with the ultraviolet rays, as shown by the image on the loft side of FIG. 3, the two-dimensional code 10 can be visually recognized as a clear image, but it is difficult to recognize the region where the colorless, transparent protective layer 61 is formed. In the case where the spark plug 1 is irradiated with ultraviolet rays, as shown by the image on the right side of FIG. 3, the region where the protective layer 61 is formed to cover the two-dimensional code 10 and its surrounding emits light of a specific color (for example, blue). As a result, in the checking step, a person can visually check the region where the protective layer 61 is formed.

Notably, in the checking step (S13), the state of the protective layer 61 may be checked. For example, checking as to whether or not the protective layer 61 has an appropriate thickness may be performed. When the thickness of the protective layer 61 is excessively large (namely, the amount of the applied invisible ink is excessively large), the accuracy in reading the two-dimensional code 10 deteriorates. When the thickness of the protective layer 61 is excessively small (namely, the amount of the applied invisible ink is excessively small), the antirust effect in the region where the two-dimensional code 10 is formed deteriorates. Therefore, the thickness of the protective layer 61 preferably falls within a predetermined range.

The thickness of the protective layer 61 can be checked by checking the amount of the fluorescent substance contained in the protective layer 61. The amount of the fluorescent substance contained in the protective layer 61 is proportional to the density of light emission (the amount of light emission) at the time when the protective layer 61 is irradiated with light. Namely, when the amount of the fluorescent substance is large, the amount of light, emission (brightness) increases, and when the amount of the fluorescent substance is small, the amount of light emission (brightness) decreases.

In view of the above, the state of the protective layer 61 is checked as follows. The amount of light emitted when the mark covered with a protective layer having a predetermined thickness is irradiated with light having a particular wavelength is used as a reference value. The amount of light emitted when the mark of a spark plug to be checked is irradiated with the same light is compared with the reference value so as to check the state of the protective layer 61.

For example, a light emission surface is photographed when the two-dimensional code 10 of the spark plug 1 is irradiated with ultraviolet rays having a wavelength of 365 nm as shown by the image on the right side of FIG. 3, and the amount of light emission (brightness) of the captured image is digitized. Also, the amount of light emission (brightness) when the protective layer whose thickness is the lower limit of an allowable range is irradiated with ultraviolet rays having a wavelength of 365 nm is measured beforehand and is stored as a lower limit threshold for the amount of light emission. Similarly, the amount of light emission (brightness) when a protective layer whose thickness is the upper limit of the allowable range is irradiated with ultraviolet rays having a wavelength of 365 nm is measured beforehand and is stored as an upper limit threshold for the amount of light emission.

In the case where the amount of light emitted when the two-dimensional code 10 of a spark plug 1 to be checked is irradiated with ultraviolet rays having a wavelength of 365 nm is not less than the lower limit threshold and not greater than the upper limit threshold, the state of the protective layer 61 provided on the two-dimensional code 10 is determined to be good. Meanwhile, in the case where the amount of light emitted when the two-dimensional code 10 of the spark plug 1 to be checked is irradiated with ultraviolet rays having a way-length of 365 nm is less than the lower limit threshold or greater than the upper limit threshold, the state of the protective layer 61 provided on the two-dimensional code 10 is determined to be unacceptable.

After completing the checking step (S13), post treatment such as cleaning is performed on the spark plug 1, if necessary.

Notably, the above-described method for manufacturing the spark plug 1 can be similarly applied to the case where the two-dimensional code 10 is applied to the metallic terminal member 52. Thus, a spark plug 1 in which the two-dimensional code 10 is formed on, for example, the end surface of the metallic terminal member 52 can be obtained.

As described above, the method for manufacturing the spark plug 1 according to the present embodiment enables application of the mark such as the two-dimensional code 10 to the surface of the metallic member such as the metallic shell 30 or the metallic terminal member 52. Also, the method for manufacturing the spark plug 1 according to the present embodiment enables formation of the protective layer 61 covering the mark.

Summary of First Embodiment

As described above, the spark plug 1 according to the present embodiment includes the insulator 50, and the metallic member such as the metallic shell 30 or the metallic terminal member 52. In this spark plug 1, for example, a mark such as the two-dimensional code 10 is formed on the surface of the metallic member. Also, the protective layer 61 is provided to cover the mark. The protective layer 61 is optically transparent and contains a fluorescent substance.

According to the above-described configuration, the protective layer 61 is provided to cover the mark, so that the mark can be protected. Therefore, it is possible to prevent deterioration of the mark, such as by rusting or rubbing off of the mark, in, for example, the process of distributing the spark plug 1.

Furthermore, the protective layer 61 contains a fluorescent substance. Therefore, after forming the mark, checking as to whether or not the protective layer 61 is formed in an appropriate region can be done by irradiating the mark with light having a predetermined wavelength, thereby causing the protective layer 61 to develop a color. Also, for example, in the process of distributing the completed spark plug 1, checking as to whether or not the protective layer 61 has peeled off can be done by irradiating a region around the mark with light having the predetermined wavelength, thereby causing the protective layer 61 to develop a color.

The method for manufacturing the spark plug 1 according to the present embodiment includes a mark forming step, a protective layer forming step, and a checking step. In the protective layer forming step, for example, an ink containing a fluorescent substance, such as invisible ink, is applied onto the mark, thereby forming the protective layer 61. In the checking step, the state of the protective layer 61 is checked by irradiating the mark with light such as ultraviolet rays.

The method for manufacturing the spark plug 1 according to the present embodiment enables application of a mark such as a two-dimensional code 10 to the surface of the metallic member such as the metallic shell 30 or the metallic terminal member 52. Also, the method for manufacturing the spark plug 1 according to the present embodiment enables forming of the fluorescent substance-containing protective layer 61 on the mark. Since the fluorescent substance-containing protective layer 61 is formed on the mark, it is possible to prevent deterioration of the mark applied to the spark plug, such as by rusting and rubbing off of the mark.

Notably, in the case where an invisible ink having a relatively low viscosity is used as the ink containing a fluorescent substance, the thickness of the protective layer can be made smaller as compared with the case where the protective layer is formed using a coating material such as UV curable resin. Therefore, even in the case where the invisible ink applied to the surface of the bearing portion 34 flows onto the front-end-side surface (bearing surface) of the bearing portion 34, to which surface the gasket 42 is attached, a decrease in the gastightness of the bearing surface is prevented. This is because the film of the ink formed on the bearing surface is thin. Also, even in the case where the ink adheres to the screw portion 35, a decrease in screw tightening torque is prevented. This is because the film of the ink formed on the screw portion 35 is thin.

Second Embodiment

Figure 4:
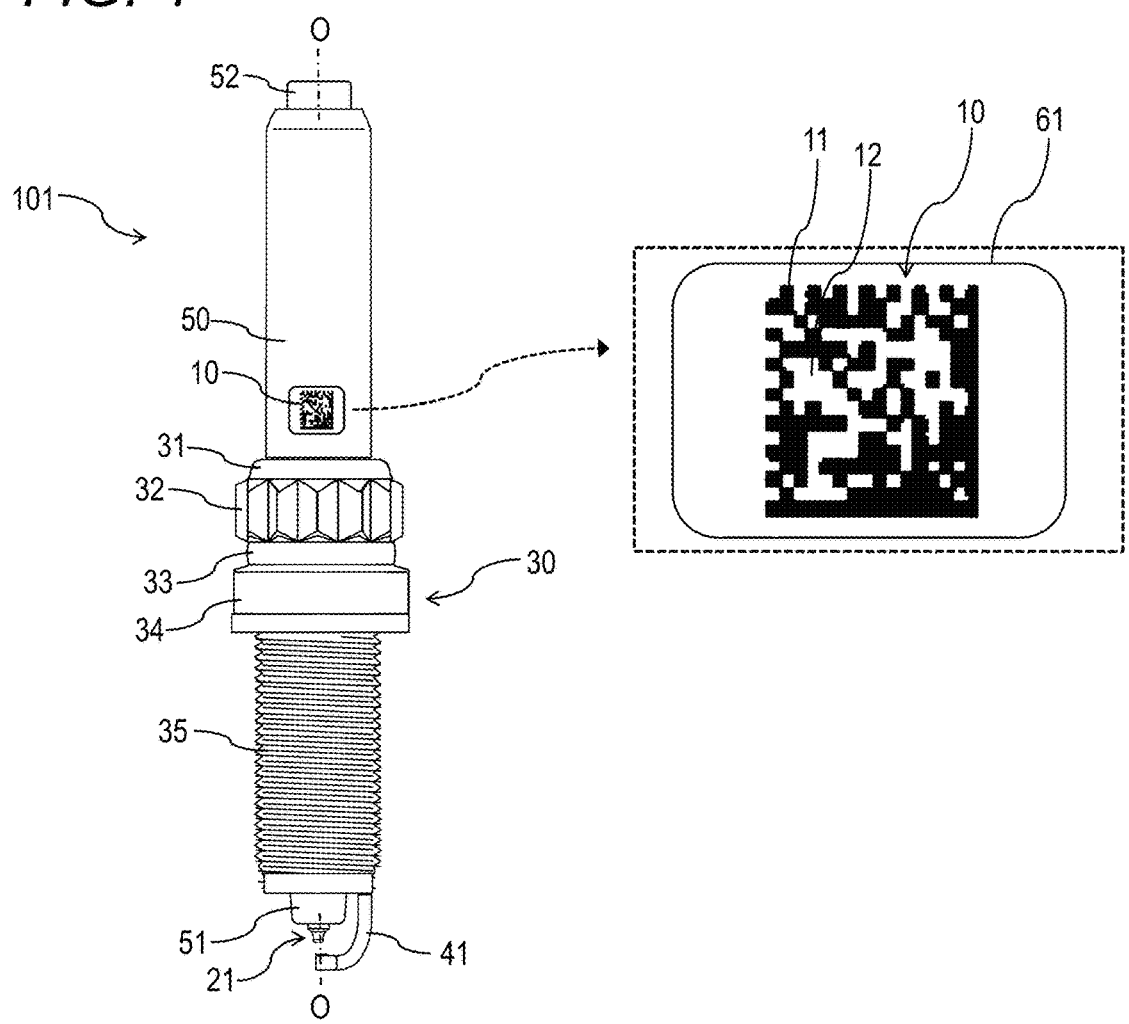
FIG. 4 includes a side view showing the appearance of a spark plug according to a second embodiment and an enlarged view of a mark applied to the spark plug.

In a second embodiment, a spark plug having a mark formed on the surface of the insulator 50 will be described as an example of the spark plug of the present invention. FIG. 4 shows the appearance of a spark plug 101 according to the present embodiment. Also, FIG. 4 shows the mark (specifically, two-dimensional code 10) applied to the spark plug 101 on an enlarged scale.

The spark plug 101 includes an insulator 50 and a metallic shell 30. The insulator 50 and the metallic shell 30 may have the same structures as the insulator 50 and the metallic shell 30 of the spark plug 1 according to the first embodiment.

A two-dimensional code 10, which is one example of the mark, is applied to the spark plug 101. In the spark plug 101 according to the present embodiment, the two-dimensional code 10 is applied to an arbitrary position on the surface of the insulator 50. The specific configuration of the two-dimensional code 10 may be the same as the two-dimensional code 10 employed in the first embodiment.

Next, a method for manufacturing the spark plug 101 will be described. Here, of steps of the method for manufacturing the spark plug 101, a step of forming a mark, such as the two-dimensional code 10 and a step of forming a protective layer 61 which covers the mark will be mainly described.

FIG. 2 shows successive steps associated with formation of the two-dimensional code 10 and the protective layer 61. The method for manufacturing the spark plug 101 includes a mark forming step (S11), a protective layer forming step (S12), and a checking step (S13).

In the mark forming step (S11), the mark is formed on a mark forming surface of the spark plug 101. In the example shown in FIG. 4, the mark forming surface is the outer circumferential surface of the insulator 50.

The surface of the insulator 50 is covered with a glaze layer. In the case where the mark is formed on the surface of the insulator 50, the mark is printed on the surface of the glaze layer by a printing method such as an ink jet method.

Notably, in the case where the mark is the two-dimensional code 10, the contrast ratio between the first portion 11 and the second portion 12 is preferably increased so as to improve the accuracy in reading the code. In the spark plug 101 according to the present embodiment, for example, the first portion 11 is formed by the ink, and the second portion 12 is formed by the glaze layer. Therefore, preferably, the glaze layer is formed on the surface of the insulator 50 using a glaze of bright color such as white, milky white, or off-white, and the mark is printed using an ink of dark color such as black, dark grey, or dark blue.

After the mark is formed on the spark plug 101 in the above-described manner, the protective layer forming step (S12) and the checking step (S13) are performed. Since the protective layer forming step (S12) and the checking step (S13) are the same as the protective layer forming step and the checking step of the first embodiment, their detailed descriptions will not be repeated.

As described above, the method for manufacturing the spark plug 101 according to the present embodiment enables application of the mark such as the two-dimensional code 10 to the surface of the insulator 50. Also, the method for manufacturing the spark plug 101 according to the present embodiment enables formation of the protective layer 61 covering the mark.

Notably, marks may be formed on the insulator 50 and the metallic member (for example, the metallic shell 30 or the metallic terminal member 52), respectively, by performing both the method for manufacturing the spark plug 1 described in the first embodiment and the method for manufacturing the spark plug 101 described in the second embodiment. In this case, the mark applied to the insulator 50 and the mark applied to the metallic member may be identical to each other or may differ from each other. In the case where different marks are applied to the insulator 50 and the metallic member, respectively, for example, a two-dimensional code may be applied to the metallic member and a mark composed of characters may be applied to the insulator 50.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2020-138440 filed Aug. 19, 2020, the disclosure of which is incorporated herein by reference in its entirety.

What is claimed is:

1. A spark plug comprising:
    an insulator;
    a metallic member;
    a mark provided on a surface of at least one of the insulator and the metallic member; and
    a protective layer which covers the mark,
    wherein the protective layer is optically transparent and contains a fluorescent substance.

2. A method for manufacturing a spark plug including an insulator and a metallic member and having a mark on a surface of at least one of the insulator and the metallic member, the method comprising:
    a mark forming step of forming the mark; and
    a protective layer forming step of forming a protective layer containing a fluorescent substance which covers the mark.

3. The method for manufacturing a spark plug as claimed in claim 2, further comprising a checking step of checking, after the protective layer forming step, a state of the protective layer by irradiating the mark with light.

4. The method for manufacturing a spark plug as claimed in claim 3, wherein, in the checking step, the state of the protective layer is checked using, as a reference value, an amount of light emitted when a mark covered with a protective layer having a predetermined thickness is irradiated with the light, measuring an amount of light emitted when the spark plug to be checked is irradiated with the light, and comparing the measured light emission amount with the reference value.

* * * * *